United States Patent
Ren

(10) Patent No.: US 11,567,177 B2
(45) Date of Patent: Jan. 31, 2023

(54) OPTICAL PHASED ARRAY LIDAR

(71) Applicant: SUTENG INNOVATION TECHNOLOGY CO., LTD, Shenzhen (CN)

(72) Inventor: Yalin Ren, Shenzhen (CN)

(73) Assignee: SUTENG INNOVATION TECHNOLOGY CO., LTD, Shenzhen (CN)

(*) Notice: Subject to any disclaimer, the term of this patent is extended or adjusted under 35 U.S.C. 154(b) by 407 days.

(21) Appl. No.: 16/630,231

(22) PCT Filed: Jul. 11, 2017

(86) PCT No.: PCT/CN2017/092451
§ 371 (c)(1),
(2) Date: Jan. 10, 2020

(87) PCT Pub. No.: WO2019/010621
PCT Pub. Date: Jan. 17, 2019

(65) Prior Publication Data
US 2021/0149024 A1    May 20, 2021

(51) Int. Cl.
*G01S 7/481* (2006.01)
*G01S 7/4912* (2020.01)
*G01S 17/36* (2006.01)

(52) U.S. Cl.
CPC .......... *G01S 7/4817* (2013.01); *G01S 7/4814* (2013.01); *G01S 7/4917* (2013.01); *G01S 17/36* (2013.01)

(58) Field of Classification Search
CPC .............................. G01S 7/4814; G01S 7/4817
See application file for complete search history.

(56) References Cited

U.S. PATENT DOCUMENTS 10,073,177 B2 *  9/2018  Montoya ................. G01S 17/89
2006/0091305 A1  5/2006  Grunnet-Jepsen et al.
(Continued)

FOREIGN PATENT DOCUMENTS

CN  106410607 A  2/2017
CN  106501791 A  3/2017
(Continued)

OTHER PUBLICATIONS

Jie Sun, et al., "Large-Scale Silicon Photonic Circuits for Optical Phased Arrays," IEEE Journal of Selected Topics in Quantum Electronics, vol. 20 Issue 4, Nov. 28, 2013.

*Primary Examiner* — Michael A Lyons
(74) *Attorney, Agent, or Firm* — Rimon PC

(57) ABSTRACT

A phased array lidar includes: a laser generator (100) configured to generate original laser; an optical transmitting medium (400); an optical splitting apparatus (200) coupled to the laser generator (100) through the optical transmitting medium (400); the optical splitting apparatus (200) including a device configured to receive the original laser; and Z radiation units (300), each being respectively coupled to the optical splitting apparatus (200), where Z is a natural number greater than 1. The optical splitting apparatus (200) is configured to split the original laser into Z first optical signals, and send each of the Z first optical signals respectively to the radiation units (300), so that electromagnetic waves radiated by all of the radiation units (300) are combined into a beam of radar waves. The laser generator (100), the device, and the optical transmitting medium (400) are made of a material capable of transmitting laser having power greater than a set power value.

13 Claims, 1 Drawing Sheet

(56) References Cited

U.S. PATENT DOCUMENTS

| | | | | |
|---|---|---|---|---|
| 2009/0033556 A1* | 2/2009 | Stickley | ............ | H01Q 21/0006 342/25 A |
| 2015/0346340 A1 | 12/2015 | Yaacobi et al. | | |
| 2015/0378241 A1* | 12/2015 | Eldada | ................... | G02F 1/292 359/299 |
| 2017/0016990 A1* | 1/2017 | Yaacobi | ............... | G01S 7/4814 |
| 2017/0234984 A1* | 8/2017 | Khial | ................... | G01S 7/4817 356/5.1 |

FOREIGN PATENT DOCUMENTS

| | | |
|---|---|---|
| CN | 106526571 A | 3/2017 |
| CN | 106575017 A | 4/2017 |
| CN | 106597413 A | 4/2017 |

* cited by examiner

OPTICAL PHASED ARRAY LIDAR

RELATED APPLICATIONS

The present application is a US national stage application of PCT/CN2017/092451 filed on Jul. 11, 2017, the content of which is hereby incorporated by reference in its entirety.

TECHNICAL FIELD

The present disclosure relates to the field of lidar technology, in particular to an OPA (optical phased array) lidar.

BACKGROUND

A lidar is a sensor that uses laser to perform detection and ranging. Its principle is similar to that of radar and sonar, that is, to emit, with an emitting device, a laser pulse to a target, and to measure, with a receiving device, delay and intensity of a return pulse; so as to measure distance and reflectivity of the target. A conventional lidar uses a mechanical rotating device to achieve a 360-degree spatial scanning, and such a lidar suffers from excessive bulkiness of the mechanical device and a slow scanning rate, and therefore it is difficult to continue normal use once the mechanical rotating device fails.

To solve these problems, OPA lidars have emerged. An OPA lidar has a matrix of many identical antennas, and radiation waves from all antennas form a beam of radar wave in the far field through interference. An electronic system controls phase of each antenna in real time to control a direction of the radar wave in the far field. By changing phase of some of the antennas, the electronic system can change the direction of the radar waves for dynamic scanning. Such electronic scanning does not require a mechanical rotating device, has a high scanning rate, and does not affect the actual use of the OPA lidar even if a small number of the antennas fail. However, it is difficult for the traditional OPA lidar to achieve a high transmitting power, and how to improve the transmitting power of the OPA lidar remains an urgent problem to be solved.

SUMMARY

Based on this, it is necessary to provide an OPA lidar capable of improving transmitting power of the OPA lidar.

An OPA lidar includes: a laser generator configured to generate an original laser; an optical transmitting medium; an optical splitting apparatus coupled to the laser generator through an optical transmitting medium; the optical splitting apparatus including a device configured to receive the original laser; and Z radiation units, each being respectively coupled to the optical splitting apparatus, where Z is a natural number greater than 1. The optical splitting apparatus is configured to split the original laser into Z first optical signals, and send each of the first optical signals to the radiation units separately, so that electromagnetic waves radiated by all of the radiation units are combined into a beam of radar waves. The laser generator, the device, and the optical transmitting medium are made of a material capable of transmitting laser having power greater than a set power value.

Details of one or more embodiments of the present disclosure are set forth in the accompanying drawings and description below. Other features, objects, and advantages of the present disclosure will be apparent from the description, drawings and appended claims.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Obviously, the drawings in the following description are only certain embodiments of the present disclosure, and those skilled in the art can obtain drawings of other embodiments according to the drawings without any creative work.

DETAILED DESCRIPTION

Figure 1:
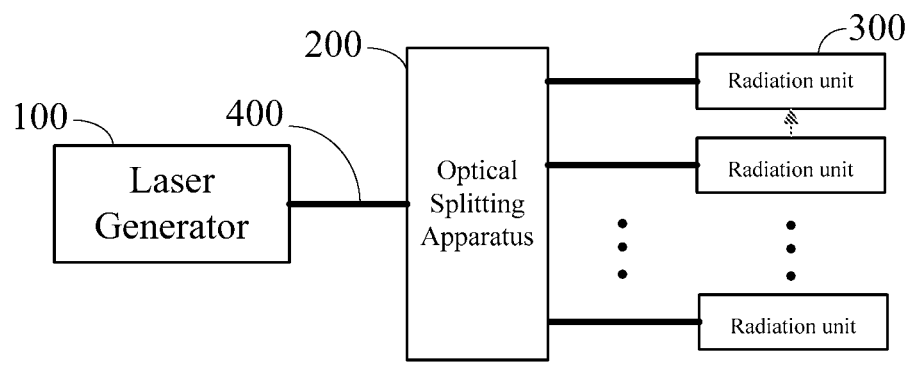
FIG. 1 is a block diagram of an OPA lidar according to an embodiment.

In order to facilitate the understanding of the present disclosure, the present disclosure will be described more fully hereinafter with reference to the accompanying drawings. Preferred embodiments of the present disclosure are shown in the drawings. However, the present disclosure may be embodied in many different forms and is not limited to the embodiments described herein. Rather, these embodiments are provided so that the understanding of the present disclosure will be more fully understood.

Unless otherwise defined, all technical and scientific terms used herein have the same meaning as generally understood by those skilled in the art to which the present disclosure pertains. The terminology used herein is for the purpose of describing the particular embodiments, and is not intended to limit the present disclosure. The term "and/or" as used herein includes any and all combinations of one or more of the associated listed items.

Referring to FIG. 1, an embodiment provides an OPA lidar including a laser generator 100, an optical transmitting medium 400, an optical splitting apparatus 200, and Z radiation units 300. The laser generator 100 is coupled to the optical splitting apparatus 200 via the optical transmitting medium 400. The optical splitting apparatus 200 is coupled to the radiation units 300 respectively. Z is a natural number and Z>1.

The laser generator 100 is configured to generate an original laser. The original laser is a laser, and for a long-range lidar, a high power is needed. The optical transmitting medium 400, such as an optical waveguide, is capable of transmitting optical waves.

The optical splitting apparatus 200 is configured to split the original laser into Z first optical signals, and send each of the first optical signals to the radiation units 300 respectively, so that electromagnetic waves radiated by all of the radiation units 300 are combined into a beam of radar waves. In other words, the optical splitting apparatus 200 has Z outputs, each of which is coupled to one radiation unit 300 such that each of the first optical signals is transmitted to different radiation units 300 through different optical paths. The first optical signal refers to a light wave obtained by performing power splitting on the original laser by a certain proportion.

The optical splitting apparatus 200 is, for example, an optical coupler or an optical beam splitter, and functions to split the original laser into each of the radiation units 300. The optical coupler is, for example, a directional coupler or a star coupler. The optical beam splitter is, for example, a multi-mode interferometer (MMI) or a Y-shaped beam splitter. Specifically, the optical splitting apparatus 200 evenly splits the original laser into each of the radiation units 300. That is, the first optical signals have the same amount of energy.

The radiation unit 300 can modulate the phase of the received first optical signal and radiate the corresponding electromagnetic wave. Therefore, by modulating the phase shift amount of each radiation unit 300, the phase distribution of the electromagnetic waves can be changed, so that the electromagnetic waves radiated by all of the radiation units 300 are combined into specific radar waves by interference in the far field.

Specifically, the optical transmitting medium 400, the optical splitting apparatus 200, and the radiation unit 300 can all be fabricated using silicon photonic technology. Silicon photonic technology uses silicon and silicon-based substrate materials as an optical media to fabricate corresponding photonic devices and optoelectronic devices (e.g., silicon-based light-emitting devices, modulators, detectors, optical waveguide devices, etc.) through integrated circuit processes and utilize these devices to excite, process, and manipulate photons to achieve their practical applications in the fields of optical communication, optical interconnection, optical computing, etc.

Additionally, the optical splitting apparatus 200 includes a device configured to receive the original laser. Moreover, the device, the laser generator 100, and the optical transmitting medium 400 are made of a material capable of transmitting laser having power greater than a set power value. For example, the laser generator 100, the optical transmitting medium 400, and the optical splitting apparatus 200 are required to be capable of transmitting high-power laser. Specifically, the set power value satisfies a condition that the OPA lidar can detect a target located at a distance farther than a set distance value by using the original laser whose power is the set power value. For example, the set power value can at least meet the needs of a remote lidar. Specifically, the set power value is, for example, greater than 10 W. At this time, the material of the laser generator 100, the optical transmitting medium 400, and the device configured to receive the original laser in the optical splitting apparatus 200 is capable of transmitting laser having power greater than 10 W. Alternatively, the material of the laser generator 100, the optical transmitting medium 400, and the device configured to receive the original laser in the optical splitting apparatus 200 is, for example, but not limited to, SiN.

The laser generator 100, the optical transmitting medium 400 and the device configured to receive the original laser in the optical splitting apparatus 200 together constitute a transmission optical path of the original laser. The performance of the transmission optical path directly determines the magnitude of the input power acceptable to the OPA lidar. Since the input power of the laser generator 100 is as high as possible for a long-range lidar, and in the present embodiment, the laser generator 100, the optical transmitting medium 400, and the device configured to receive the original laser in the optical splitting apparatus 200 are all capable of transmitting high-power laser, i.e., the transmission optical path of the original laser can let high-power laser pass, thereby increasing the input power of the OPA lidar. As the input power is increased, the total power of the radar waves combined by all of the radiation units 300 is correspondingly increased; thereby the detecting distance is extended.

In one embodiment, the phase modulated efficiency of the material of the radiation unit 300 is greater than a set efficiency threshold. For example, the radiation unit 300 is made of a material having a high phase modulated efficiency (for example, Si), so that the phase modulated efficiency of the entire OPA lidar can be improved.

Figure 2:
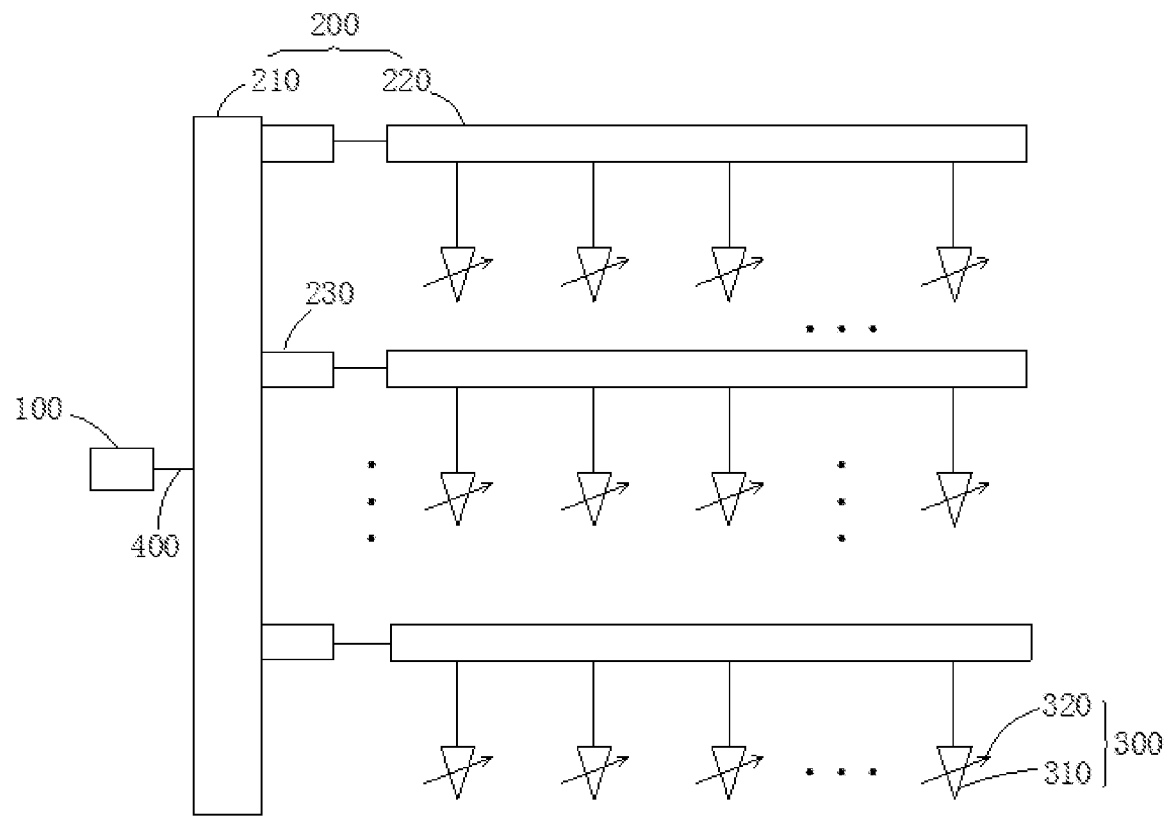
FIG. 2 is a schematic structural view of an OPA lidar according to an embodiment.

In particular, all of the radiation units 300 constitute a planar array. Referring to FIG. 2, the optical splitting apparatus 200 includes a first optical splitting unit 210 and M second optical splitting units 220. The laser generator 100 is coupled to the first optical splitting unit 210 through the optical transmitting medium 400. The first optical splitting unit 210 is coupled to each of the second optical splitting units 220. That is, the first optical splitting unit 210 includes one input and M outputs, and each output is coupled to one second optical splitting unit 220. The second optical splitting unit 220 is coupled to N radiation units 300. M and N are both natural numbers, and M×N=Z. Therefore, the second optical splitting unit 220 includes one input and N outputs. If each second optical splitting unit 220 is located in a different column, the different second optical splitting units 220 are coupled to N radiation units 300 located in different columns.

The first optical splitting unit 210 splits the original laser into M second optical signals, and sends the M second optical signals respectively to corresponding second optical splitting units 220. The second optical signal refers to a light wave obtained by performing power splitting on the original laser by a certain proportion. Specifically, the first optical splitting unit 210 is, for example, a 1:M optical coupler or a 1:M optical beam splitter. Further, the power of the second optical signal is less than or equal to 1/M times the power of the original laser. Therefore, in the present embodiment, the first optical splitting unit 210 is a device configured in the optical splitting apparatus 200 to receive the original laser, and the first optical splitting unit 210 is made of a material capable of transmitting laser having power greater than a set power value.

The second optical splitting unit 220 splits the second optical signal into N first optical signals, and sends the first optical signals respectively to the corresponding radiation units 300. Specifically, the second optical splitting unit 220 is, for example, a 1:N optical coupler or a 1:N optical beam splitter. Further, the power of the first optical signal is less than or equal to 1/N times the power of the second optical signal. That is, the power of the first optical signal is less than or equal to 1/(M×N) times the power of the original laser.

Specifically, the first optical splitting unit 210 and the second optical splitting unit 220 are optical couplers or optical beam splitters.

Further referring to FIG. 2, the optical splitting apparatus 200 further includes M phase modulators 230. Each of the M phase modulators 230 is coupled between the first optical splitting unit 210 and a respective second optical splitting unit 220. In other words, each output of the first optical splitting unit 210 is coupled to one second optical splitting unit 220 via one phase modulator 230. The phase modulator 230 is configured to modulate the phase of the second optical signal, and send a phase-modulated second optical signal to a corresponding second optical splitting unit 220. Therefore, each phase modulator 230 can simultaneously control phases of the radiated waves of all the radiation units 300 in one column, so that phase modulated efficiency can be improved.

Specifically, the phase modulator 230 may perform phase modulation using a thermo-optic effect or a plasma-dispersion effect. For example, the phase modulator 230 can be an optical waveguide controlled by a micro heater or an optical waveguide containing a PN junction. Specifically, the manufacturing material of the phase modulator 230 is, for example but not limited to, Si.

Further, in the OPA lidar described above, the phase modulated efficiency of the material of each structure on the optical path after the first optical splitting unit 210 in the transmission direction of the original laser is greater than a set efficiency threshold. For example, each structure on the optical path after the first optical splitting unit 210 is made of a material having a high phase modulated efficiency. Specifically, in FIG. 2, starting from the phase modulator 230 to the radiation unit 300, the phase modulated efficiency of the material of all structures through which the light passes is greater than the set efficiency threshold. Since the optical power is less than (1/M) times the original laser power after the light passes through the first optical splitting unit 210, and is less than 1/(M×N) times the original laser power after the light passes through the second optical splitting unit 220, respectively, the structures on the optical path after the first optical splitting unit 210 need not to be made of a material capable of transmitting high-power laser, that is, they may be made of a material different from the first optical splitting unit 210 and the optical transmitting medium 400, for example, a material having a high phase modulated efficiency to improve the phase modulated efficiency.

Therefore, the above-mentioned OPA lidar provided by the embodiment adopts different materials in different optical paths of the front and rear stages, and can transmit laser with high power and has characteristics of large-scale phase modulation, thereby realizing a lidar having a long detecting distance and a large scan angle.

Specifically, referring to FIG. 2, the radiation unit 300 includes an optical antenna 310 and a phase modulator 320. The phase modulator 320 is configured to phase-modulate the first optical signal from the second optical splitting unit 220, and transmit the phase-modulated optical signal through the optical antenna 310. In particular, the phase modulator 320 can be controlled by an electronic system to modulate the phase of the optical antenna 310. Optionally, the phase modulator 320 can perform phase modulation using a thermo-optic effect or a plasma dispersion effect.

Therefore, in the above-described OPA lidar provided in this embodiment, under the premise that the phase modulator 230 is included, not only all the optical antennas 310 in one column can be modulated by the phase modulator 230 to emit electromagnetic waves of the same phase, but also the different optical antennas 310 of each column can emit electromagnetic waves of different phases through the phase modulator 320 in each of the radiation units 300, thereby generating a high-precision radiation splitting pattern by interference in the far field.

The technical features of the above-described embodiments may be arbitrarily combined. For the sake of brevity, not all possible combinations of the technical features in the above embodiments are described. However, as long as there is no contradiction between the combinations of these technical features, they should be considered as within the scope of the specification.

The above-described embodiments are merely illustrative of several embodiments of the present disclosure, and the description thereof is more specific and detailed, but is not to be construed as limiting the scope of the present disclosure. It should be noted that a number of variations and modifications may be made by those skilled in the art without departing from the spirit and scope of the present disclosure. Therefore, the scope of the present disclosure should be determined by the appended claims.

The invention claimed is:

1. An optical phased array lidar, comprising:
   a laser generator configured to generate an original laser beam;
   an optical transmitting medium;
   an optical splitting apparatus coupled to the laser generator through the optical transmitting medium; and
   Z radiation units, where Z is a natural number greater than 1;
   wherein the optical splitting apparatus is configured to split the original laser beam into Z first optical signals, and send each of the Z first optical signals respectively to the corresponding radiation units to cause electromagnetic waves radiated by all of the radiation units to be combined into a beam of lidar waves
   wherein the optical splitting apparatus comprises a first component, M phase modulators, and M second components, wherein the first component is configured to split the original laser beam into M second laser beams, each phase modulator is configured to modulate a phase of each of the M second laser beams to produce a phase-modulated second laser beam, each of the M second components is configured to split each phase-modulated second laser beam into N first optical signals, wherein M and N are natural numbers and M×N=Z.

2. The optical phased array lidar of claim 1, wherein the optical phased array lidar is configured to utilize the original laser beam having power of the set power value to detect a target located at a distance farther than a set distance value.

3. The optical phased array lidar of claim 2, wherein the laser generator, the device and the optical transmitting medium are made of a material suitable for transmitting laser having power greater than a set power value, and wherein the set power value is greater than 10 W.

4. The optical phased array lidar of claim 3, wherein a material of the laser generator and the optical transmitting medium is SiN.

5. The optical phased array lidar of claim 1, wherein a phase modulated efficiency of a material of the radiation unit is greater than a set efficiency threshold.

6. The optical phased array lidar of claim 5, wherein a material of the radiation unit is Si.

7. The optical phased array lidar of claim 5, wherein the optical splitting apparatus comprises:
   the first component coupled to the laser generator through the optical transmitting medium, wherein the first optical splitting unit is configured to transmit a laser beam having power greater than a second set power value; and
   the M second components, wherein each of the M second components is respectively coupled to the first component, and each of the M second components is coupled to N radiation units;
   wherein a material of the second component is different than a material of the first component.

8. The optical phased array lidar of claim 7, wherein the first component and the second components are optical couplers or optical beam splitters.

9. The optical phased array lidar of claim 7, wherein in the phased array lidar, a phase modulated efficiency of a material of each structure located on an optical path after the first optical splitting unit in a direction along which the original laser beam is transmitted is greater than the set efficiency threshold.

10. The optical phased array lidar of claim 1, wherein each phase modulator is configured to perform phase modulation using a thermo-optic effect or a plasma dispersion effect.

11. The optical phased array lidar of claim 1, wherein each radiation unit comprises an optical antenna and a phase modulator.

12. The optical phased array lidar of claim 11, wherein each phase modulator is configured to perform phase modulation using a thermo-optic effect or a plasma dispersion effect.

13. The optical phased array lidar of claim 1, wherein the optical transmitting medium is an optical waveguide.

* * * * *